L. A. MAPEL.
SAFETY VALVE.
APPLICATION FILED NOV. 6, 1919.
1,361,884.
Patented Dec. 14, 1920.
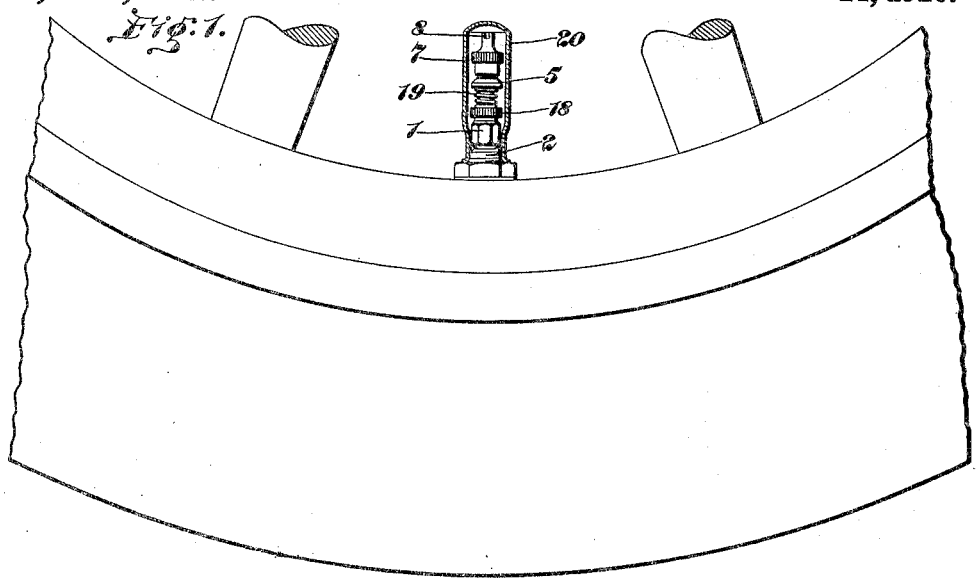
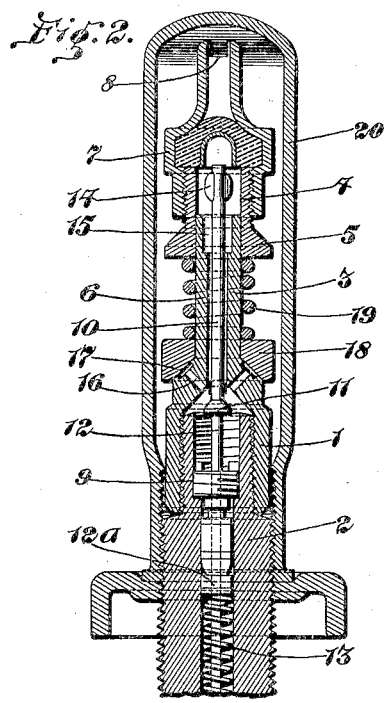

UNITED STATES PATENT OFFICE.

LEWIS A. MAPEL, OF ST. LOUIS, MISSOURI.

SAFETY-VALVE.

1,361,884.  Specification of Letters Patent.  Patented Dec. 14, 1920.

Application filed November 6, 1919. Serial No. 336,196.

*To all whom it may concern:*

Be it known that I, LEWIS A. MAPEL, a citizen of the United States, residing in the city of St. Louis and State of Missouri, have invented a new and useful Safety-Valve, of which the following is a specification.

This invention relates to safety valves.

An object of the invention is to provide an efficient safety valve to be permanently attached to the housing of the usual tire valve equipment, either before or after the tire has been mounted on a wheel, of such size that the device may pass through the usual holes in the wheel rim and felly, and provided with means for connection with a hose for the inflation of the tire; and also provided with means for relieving all pressure over and above the amount required to inflate the tire permanently.

Another object is to provide a valve of the character and for the purpose mentioned to be permanently attached to the housing of the usual tire valve equipment, including a plunger abutting stem of the tire valve and also including means for opening the valve in the air hose and preventing excess pressure from being applied against the stem of the tire valve.

Another object of the invention is to provide a valve of the character and for the purpose mentioned including a valve for relieving all pressure over and above the amount required to inflate the tire properly, said last named valve being capable of manipulation to loosen the same from the coöperating members, so that said valve will function properly to accomplish its objects.

In the drawing illustrating an embodiment of the invention:

Figure 1 is a view showing my improved safety valve connection with the usual tire valve equipment on a wheel.

Fig. 2 is an enlarged sectional view of the device.

My improved safety valve comprises a housing, one form of which is shown in Fig. 2, having an interiorly threaded portion 1 adapted to be screwed upon the outward end of the housing 2 of the regular or usual tire valve equipment. The housing which my invention comprises may be permanently attached to the part 2 of the usual tire valve equipment, either before or after the tire is placed upon a wheel; and the housing included in my invention is small enough to pass through the usual holes in the rim and felly of the wheel through which the part 2 passes, so that it is unnecessary to detach my invention from the usual equipment in mounting and demounting the tire. The housing which is a part of my invention has a stem 3, the outer end of which supports a part 4, which may be, and preferably is, removable and adjustable by the application of sufficient pressure thereto, and adapted to be engaged by the air hose, and having a circumferential flange 5 provided with a beveled outer wall arranged to serve as an abutment for the end of the air hose coupling to prevent the escape of air. A passage 6 through the housing which my invention comprises admits air from the air hose into the housing 2 of the regular tire valve equipment.

To protect the parts from the admission of dust and other foreign substances, a removable cap 7 is employed, the same having threaded connection with the part 4 and preferably being formed with a notch 8 in its upper end to constitute means for turning the adjustment nut 9 of the tire valve.

Within the passage 6 a plunger 10 is mounted, the same having a base 11 at its inner end arranged to bear against the end of the valve stem 12 of the regular tire valve equipment which, as is well known, is movable axially against the pressure of a spring 13 as required to open the tire valve 12ª of the regular tire valve equipment in order to admit air into the tire. When the air hose is connected to the part 4 that part thereof which ordinarily engages the valve stem 12 contacts with the end of the plunger 10 and presses the same inwardly, thereby moving the valve stem 12 to open the tire valve as would occur if the air hose were attached to the housing 2.

The plunger 10 is prevented from falling or being taken out of the housing in which it is mounted by the base 11 which is larger than the passage 6, and by projections 14 which may be formed on or secured to the outer end of the plunger 10. The outer end of the housing part 3 is formed with a recess 15 to receive the projections 14 when the plunger 10 is pressed inwardly. When the air hose is connected with the device, the member 4 receives the usual valve stem (not shown) on the air hose and permits the valve stem to actuate the plunger 10. The end of the part 3 of the housing constitutes an abutment for the stem on the air chuck and thereby stops movement of said stem, thus preventing too great pressure from being applied against the plunger 10 and the stem 12. This construction permits the plunger 10 and the stem 12 to be moved inwardly far enough to open the tire valve, but prevents the plunger and the stem from being bent or otherwise disarranged.

A beveled valve seat is formed on the shoulder at the union of the part 1 with the stem 3, and a number of passages 16 through the wall of the housing at the valve seat. The passages 16 open into a groove 17 around the valve seat, thus affording a larger area for the air to press against the valves. A valve 18 is fitted over the stem 3 and is provided with a recess, the wall of which fits closely against the valve seat to close the passages 16. The periphery of the valve 18 may be grooved as shown, or otherwise formed so that the valve may be readily gripped by the fingers of the hand and turned in order to loosen the valve so that it will function properly.

A spring 19 encircles the stem 3 between the member 4 and the valve 18 and presses the valve to closed position upon the valve seat. By providing a spring of the desired tension, the valve may be made to open when the desired pressure is exceeded; or the tension and energy of the spring may be varied by adjustment of the member 4.

A casing 20 may be provided to inclose the device and protect the operative parts. As shown, the casing effects releasable connection with the end of the housing 2, but may readily be removed.

From the foregoing it is apparent that when the air hose is connected to the part 4, the usual stem (not shown) of the air chuck presses the plunger 10 inwardly a sufficient distance to open the tire valve to admit air until the desired pressure or inflation is obtained. Then, when the desired pressure at which the device is intended to operate is exceeded, the valve 18 is forced open by the air pressure, thereby permitting the same quantity or volume of air to escape as enters the valve housing from the air hose and preventing any additional pressure from entering the tire.

It is apparent that my invention completely accomplishes its objects. I am aware that the arrangement may be varied without departure from the scope of the invention. I do not restrict myself to unessential features, but what I claim and desire to secure by Letters Patent is:—

1. A safety valve of the character described comprising a housing adapted to be permanently attached to the housing of the usual tire valve and being movable through the usual holes in the tire rim and felly; a passage through the housing communicating with the passage through the tire valve housing; a plunger in said passage for actuating the stem of the tire valve; and a manually engageable valve having a hole through which the first-named housing extends and being operable by the pressure of the air from within the housing to relieve all pressure over and above a predetermined amount of pressure to which it is desired to inflate the tire.

2. The combination with a housing of the usual tire valve of the type which is in permanent connection with the inner tube of a tire and which is movable through the usual holes in the tire rim and felly in mounting and demounting the tire; of an additional housing adapted to be permanently attached to the first-named housing; a passage through the additional housing communicating with the passage through the tire valve housing; a plunger in said passage arranged to seat against the end of the usual stem of the tire valve; a valve seat around the additional housing; a manually engageable valve seated on said valve seat and being manually movable to loosen the valve from the valve seat; an air chamber between said valve and said valve seat arranged to admit air pressure against a relatively large portion of the surface of said valve; passages opening into said air chamber from the passage through the first-named housing, whereby said valve will be moved by air pressure in said chamber to relieve all pressure over and above a predetermined amount of pressure to which it is desired to inflate the tire; and a spring on the additional housing for pressing said valve to closed position; all of the said parts which are combined with the first-named housing having transverse dimensions within the limits of the transverse dimensions of the first-named housing, whereby the entire device is bodily movable through the usual holes in the tire rim and felly in mounting and demounting the tire.

3. A safety valve of the character described comprising a housing adapted to be permanently connected to the housing of the usual tire valve and being movable therewith through the usual holes in the wheel rim and felly to mount and demount the tire; a passage through said housing communicating with the passage through the usual tire valve housing; a device mounted in the passage in said first-named housing for opening the tire valve; means for preventing removal of said device from said passage; a pressure relief passage in said first-named housing; a valve having a hole through which the first-named housing extends and being movable to open position by the pressure in said passage when the pressure of inflation within the tire exceeds a predetermined minimum; and a device holding said valve in closed position while the inflation pressure within the housing is at or below the predetermined maximum.

4. A safety valve of the character described comprising a housing adapted to be permanently connected to the housing of the usual tire valve and being movable therewith through the usual holes in the tire rim and felly in mounting and demounting the tire; a passage through said housing communicating with the passage through the usual tire valve housing; a plunger in the passage in the first-named housing abutting against the end of the stem of the tire valve; a pressure relief passage in the first-named housing; a beveled valve seat on the first-named housing; a valve seating on said valve seat closing said relief passage and movable to open position by the pressure in said passage when the pressure of inflation within the housing exceeds a predetermined maximum; and a spring encircling the first-named housing for holding said valve in closed position while the inflation pressure within the tire and housing is at or below the predetermined maximum.

5. A safety valve of the character described comprising a housing adapted to be permanently attached to the valve stem housing of the usual tire valve equipment and being movable therewith through the usual holes in the wheel rim and felly in mounting and demounting the tire; a passage through said housing for admitting air into the passage through the valve stem housing; an element on said first-named housing for connection with an air chuck; a plunger in the passage through the first-named housing movable by the usual air chuck equipment to open the tire valve; an abutment preventing the air chuck from bending the stem of the tire valve; an outlet passage in said housing; a valve normally closing said outlet passage and arranged to be opened by the pressure within the tire and housing, when such pressure exceeds a predetermined amount; and a spring encircling said first-named housing between said element and said valve, holding said valve in closed position.

6. A safety valve of the character described comprising a housing adapted to be permanently attached to the valve stem housing of the usual tire valve equipment and being movable therewith through the usual holes in the wheel rim and felly in mounting and demounting the tire; a passage through said housing for admitting air into the passage through the valve stem housing; an element on said first-named housing for connection with an air chuck; a plunger in the passage through the first-named housing movable by the usual air chuck to open the tire valve; an outlet passage in said housing; and a manually engageable and manually movable valve normally closing said outlet passage and arranged to be opened by the pressure within the tire and housing when such pressure exceeds a predetermined amount.

7. A safety valve of the character described, comprising a housing adapted to be permanently attached to the valve stem housing of the usual tire valve equipment and being movable thereby through the usual holes in the rim and felly; a passage through said housing for admitting air into the passage through the usual tire valve housing; an element on said first-named housing for connection with an air chuck; a plunger in the first-named housing movable by the usual air chuck to open the tire valve; means for preventing removal of said plunger from the housing in which it is mounted while the first-named housing is in connection with the valve stem housing; an inclined valve seat on said first-named housing having a groove therein; outlet passages in said first-named housing opening into said groove; a manually movable valve for closing and opening said outlet passages and arranged to be opened by the pressure of the air in said groove when the air pressure exceeds a desired limit; and a spring encircling the first-named housing between said element and said valve holding said valve closed.

8. The combination with the usual valve housing in permanent connection with the inner tube of a pneumatic tire, and being insertible through and withdrawable from the usual holes in the wheel rim and felly in mounting and demounting the tire; a valve in said housing; and a spring in said housing for holding said valve in closed position; of a safety valve comprising a housing adapted to be permanently attached to the first-named housing and being movable thereby through the usual holes in the wheel rim and felly in mounting and demounting the tire; a circumferential valve seat on said second-named housing; outlet passages in said second-named housing opening at said valve seat; and a manually revoluble valve seated on said valve seat and arranged to open and to close said outlet passages, and being movable to open position by the pressure in the second-named housing when the pressure of inflation exceeds a predetermined minimum.

9. A saftey valve of the character described, comprising a housing adapted to be permanently attached to the usual tire valve equipment and being movable thereby through the usual holes in the wheel rim and felly in mounting and demounting the tire; a circumferential valve seat on said housing; outlet passages in said housing opening at said valve seat; a manually revoluble valve seated on said valve seat to open and to close said outlet passages, and being movable to open position by the pressure in said housing when the pressure of inflation exceeds a predetermined minimum in any of the positions of said valve; and a spring encircling said housing for pressing said valve to closed position.

LEWIS A. MAPEL.